(12) United States Patent
Snow et al.

(10) Patent No.: US 7,118,611 B2
(45) Date of Patent: *Oct. 10, 2006

(54) NANOPARTICLE MIXTURES FOR HYDROGEN STORAGE, TRANSPORTATION, AND DISTRIBUTION

(76) Inventors: David G. Snow, 59 Lake Dr. East, Wayne, NJ (US) 07470; Charles J. Brumlik, 46 First Ave., Little Falls, NJ (US) 07424-1502

( * ) Notice: Subject to any disclaimer, the term of this patent is extended or adjusted under 35 U.S.C. 154(b) by 0 days.

This patent is subject to a terminal disclaimer.

(21) Appl. No.: 10/445,479

(22) Filed: May 27, 2003

(65) Prior Publication Data

US 2006/0101943 A1 May 18, 2006

Related U.S. Application Data

(63) Continuation of application No. 09/524,202, filed on Mar. 13, 2000, now Pat. No. 6,589,312.

(60) Provisional application No. 60/151,973, filed on Sep. 1, 1999.

(51) Int. Cl.
*B22F 1/00* (2006.01)
(52) U.S. Cl. ............... 75/255; 75/252; 977/DIG. 1
(58) Field of Classification Search ............ 75/255, 75/252; 977/DIG. 1
See application file for complete search history.

(56) References Cited

U.S. PATENT DOCUMENTS

| | | | |
|---|---|---|---|
| 4,383,606 A | 5/1983 | Hunter | |
| 5,389,468 A * | 2/1995 | Fujiwara et al. | 429/206 |
| 5,536,586 A * | 7/1996 | Tsushio et al. | 428/649 |
| 5,626,650 A | 5/1997 | Rodriguez et al. | |
| 5,840,440 A | 11/1998 | Ovshinsky et al. | |
| 5,958,098 A * | 9/1999 | Heung | 55/523 |
| 5,958,348 A | 9/1999 | Bi et al. | |
| 6,074,453 A | 6/2000 | Anderson et al. | |
| 6,103,024 A | 8/2000 | Sapru et al. | |
| 6,103,868 A | 8/2000 | Heath et al. | |
| 6,342,198 B1 * | 1/2002 | Zaluska et al. | 423/658.2 |
| 6,344,271 B1 | 2/2002 | Yadav et al. | |

FOREIGN PATENT DOCUMENTS

| | | |
|---|---|---|
| EP | 0 417 802 A | 3/1991 |
| JP | 08 114 048 A | 9/1996 |
| JP | 11 210995 A | 11/1999 |
| WO | 96 23906 A | 8/1996 |
| WO | 97 26214 A | 7/1997 |

OTHER PUBLICATIONS

Song, M. Y.; Int. J. Hydrogen Energy, 20(3) pp. 221-227 (1995).
Imaura, H., et al.; Journal of the Less-Common Metals, vol. 135, pp. 277-283 (1987).
Holtz, R.L., et al.; Journal of Materials Science, vol. 32, pp. 2267-2274 (1997).
Singh, A. K., et al.; Journal of Alloys and Compounds, vol. 227, pp. 63-68 (1995).
Imamura, H., et al.; Journal of the Less-Common Metals, vol. 123, pp. 59-63 (1986).
Chen, K.Z., et al.; Nanostructured Materials, vol. 8(2), pp. 205-213 (1997).
Lin, S.D. et al.; Journal of Catalysis vol. 143, p. 563- (1994).
Siegel, Richard W.; Creating Nanophase Materials; Scientific American; Dec. 1996; pp. 74-79.
Reilly, J. J.; Sandrock, Gary D.; "Hydrogen Storage in Metal Hydrides", Scientific American, 242(2), pp. 118-129.
Huot, J. et al; Journal of Alloys and Compounds 293-295 (1999) 495-500.
Abdellaoui, M., et al.; Journal of Alloys and Compounds 293-295 (1999) 501-507.
Z. Cui. et al. "Ce-Ni Nanoparticles with Shell Structure for Hydrogen Storage" Nanostructured Materials 7(3) (1996) pp. 355-361.
K.Z. Chen, et al. "Carsalytic Properties of Nanostructured Hydrogen Storage Nickel Particles with Cesium Shell Structure" Nanostructured Materials 8(2) (1997) pp. 205-213.
A. Zaluska, et al. "Nanocrystalline Magnesium for Hydrogen Srogage" Journal of Alloys and Compounds, 288 (1102) (1999) pp. 217-225.
R. Schultz, et. al. "Recent Developments in the Applications of Nanocrystalline Materials to Hydrogen Technologies" Material Science and Engineering A, 267(2) (1999) pp. 240-245.
Andrievsri R. A. et al. "Hydrogen Adsorption and Electrocatalytic Properties of Ultrafine LaNis Powders", International Journal of Hydrogen Energy, 21(11/12), (1996) pp. 949-954.

* cited by examiner

Primary Examiner—Ngoclan T. Mai

(57) ABSTRACT

This invention uses nanoparticle mixtures to broaden the range of economic materials, improve performance across this broader range, and thereby lower costs of hydride and other storage systems. Nanoparticles can have dramatically different mechanical, chemical, electrical, thermodynamic, and/or other properties than their parent (precursor) materials. Because of this fundamental characteristic, nanophase materials can greatly improve the range of possibilities of materials selection, performance, cost, and practicality for hydride storage systems, advancing the early commerciality of such systems for hydrogen fuel cells or other applications. Among such hydrogen storage improvements are cheaper and better-performing metals, alloys, and/or compounds; lower weight; and reduced storage volumes.

19 Claims, No Drawings

NANOPARTICLE MIXTURES FOR HYDROGEN STORAGE, TRANSPORTATION, AND DISTRIBUTION

This application is a continuation of and claims benefit of U.S. patent application Ser. No. 09/524,202 filed on Mar. 13, 2000 now U.S. Pat. No. 6,589,312, which claims benefit of U.S. provisional patent application Ser. No. 60/151,973 filed on Sep. 1, 1999.

FIELD OF THE INVENTION

This invention relates to the storage, transportation, and distribution of hydrogen and other low density fuels using nanoparticle mixtures.

BACKGROUND OF THE INVENTION

Hydrogen for use in fuel cells (and possibly as a fuel in internal combustion engines) appears poised potentially as the next major evolution in energy usage. Unfortunately, safely storing hydrogen and other low molecular weight fuels is currently very difficult and expensive. Such fuels are now stored in pressurized tanks or in hydride storage systems. Hydride storage is far safer than compressed hydrogen gas storage, and safer even than gasoline on an equivalent-energy basis (Reilly, J. J. *Sci. Amer.* 1980, 242(2), 2). However, hydrides carry both weight and cost penalties versus compressed hydrogen. As another alternative, hydrogen can be created as needed by reformers, but efficiencies are reduced. Hydrogen vehicle systems' space and weight penalties versus gasoline are about 5 times the space if stored as compressed gas, or still 3 times the space plus between 40 to 470 extra pounds of weight if stored as a metal hydride, even after taking into account the greater efficiency of hydrogen fuel cells (HFCs) versus gasoline internal combustion engines (ICEs). Additionally, these space limitations require storage to be closer to passengers, compounding safety concerns.

These storage limitations penalize not just on-board vehicle storage and vehicle range, but also the capacity for overall transportation and distribution of hydrogen versus gasoline or other existing fuels, and its storage prior to use. These limitations in turn limit where, how efficiently, and how cleanly hydrogen can be produced. For example, hydrogen generation onboard vehicles from methanol or gasoline reformers cuts total emissions only 7–35%, while steam reforming at service stations would reduce emissions by 40%, and remote generation would reduce emissions by 60–70%, given a practical and economical storage method. A better method of both on-board storing, and transporting and distributing, of hydrogen, including pure HFC vehicles would have a significant and broad positive impact on this emerging new industry.

Generation of hydrogen at the site of remote electric power generating plants and then shipment of the hydrogen to markets using economical storage systems could entail less energy loss than if electricity is transmitted to local service stations for generating hydrogen on site. Cheaper natural gas costs could also be accessed by generating hydrogen closer to the sources of gas. Economies of scale of larger volume hydrogen production could be realized. Transmission-distribution wires in many cases could be avoided. And attendant air pollution could be removed from the local area urban centers, where smog is the principal concern. Renewable energy supplies (solar, wind, etc.) could also be accessed given an economic transportation system.

Stationary HFCs are likely to be introduced in homes and industry concurrently with vehicular use. Because manufacturing costs of HFCs and hydrogen generators will both decline with the volume permitted by introduction of HFCs to the vehicle market, HFCs should simultaneously begin penetrating homes and industry, for both heating and electricity. Whereas the proton exchange membrane (PEM) HFC is targeted for vehicles, with an efficiency of about 50% versus 25% for the ICE vehicle, still higher-efficiency fuel cells are being developed for stationary use, with efficiencies of 60–80%, versus 30–60% for conventional power generation (the upper ends of ranges in both cases including cogeneration). These stationary fuel cells include the molten carbonate, phosphoric acid, solid oxide, alkaline, direct methanol, and other fuel cells.

HFCs for portable power products, such as, but not limited to computers, can be introduced concurrently with vehicular use; again, riding the cost and technology curves developed for HFCs and hydrogen generation for the other markets. These stationary HFC markets, portable power product markets, and vehicle HFCs will all require hydrogen to be safely, inexpensively, and conveniently delivered, as well as stored before use.

HFC's main problems are vehicle range, safety, and hydrogen fuel availability. These problems are all in turn aspects of the problem of hydrogen storage. A HFC system may achieve the same range as for gasoline ICE (a usual target being 380 miles), but 3–5 times the space and possibly far greater weight are required compared to gasoline. The extra space required also adds to real or perceived safety concerns. These space and weight penalties also affect the ease of transportation and distribution of hydrogen, which in turn makes vehicle range concerns still more sensitive. The space and weight limits, and associated safety concerns, represent the largest negatives for HFCs.

Most critical is the space required for compressed hydrogen storage. Hydrogen today is stored at 2,000–2,500 psi (14–17 mPa) and requires large, heavy containers. Even at 5,000 psi, the standard currently being pursued for development in the auto industry, the space required is still about 5 times that of gasoline, even after allowing for the greater efficiency of the HFC versus the ICE. Table 1 summarizes these limits, along with weight limitations of the various systems.

This greater space requirement either limits the vehicle's range between refueling—especially important with a limited hydrogen infrastructure—and/or requires storage closer to passengers, raising safety concerns.

TABLE 1

Space and Weight of Fuel and Tanks for 380 Mile/Tank Range Vehicle

|  | Gasoline | 5000 Psi Hydrogen | Hydride |
|---|---|---|---|
| Mileage | 29 mpg | 64 mpg (2.2 times gasoline ICE) | 64 mpg (2.2 times gasoline ICE) |
| Gallons | 13 gallons | 4.7 kilograms | 4.7 kilograms |
| Tank Size | 14 gallons | | |
| Volume | 1.87 cubic ft. | 9.36 cubic ft. | 5.7 cubic ft. |
| Volume versus Gasoline | — | 5 times | 3 times |
| Weight Fuel | 73 lbs. | 10.3 lbs. | 10.3 lbs. |
| Weight Tank | 29 lbs. | 100 lbs. | 140–570 lbs.* |
| Total Weight | 102 lbs. | 110 lbs. | 150–580 lbs.* |

TABLE 1-continued

Space and Weight of Fuel and Tanks
for 380 Mile/Tank Range Vehicle

| | Gasoline | 5000 Psi Hydrogen | Hydride |
|---|---|---|---|
| Weight versus Gasoline | — | Similar | +40–470 lbs.* |

*Lower weight is magnesium hydride; higher weight is more economical and currently practical iron-titanium hydride.
Source: "Onboard Compressed Hydrogen Storage," by Brian James, C. E. Thomas, and Franklin D. Lomax, Jr., Directed Technologies, Inc, Arlington, Va., February, 1999.

If hydrogen gas were compressed to 10,000 psi (also being considered for development), it would occupy about the same space as liquid hydrogen; but this is still about 3 times that of gasoline. However, even pressurizing to 5,000 psi may raise some significant safety concerns, and pressuring to 10,000 psi, when and if economically possible, might simply add to those concerns. Liquid cryogenic hydrogen storage requires very low temperature of −253° C.

Liquid cryogenic hydrogen, which takes up 3 times the space than gasoline, is impractical due to the extremely low temperatures required (minus 423 degrees Fahrenheit), the energy and cost that must be expended to liquefy hydrogen (approximately doubling its delivered cost), and the losses during storage as the liquid hydrogen slowly boils off and escapes. Some such losses might also occur in 10,000 psi compressed hydrogen gas.

Hydrogen has many safety concerns. Hydrogen must in any case be compressed to a significant pressure, since uncompressed hydrogen (i.e., at atmospheric pressure) has only $\frac{1}{1330}$ the energy density, and thus takes 1330 times the space, of gasoline. The onboard vehicular storage of hydrogen gas at any pressure raises safety concerns in the event of an accident, since the storage tank must be far stronger than that for gasoline to prevent rupture. The sudden release of such highly compressed gas could itself pose a significant safety hazard in the event of an accident, spewing an instantly flammable cloud.

Slower leaks likewise pose an ongoing concern. This is especially true since parking indoors would create its own safety problems, which would require re-engineering buildings. This is because hydrogen rises, and most garages are not protected from upward rising gasses. Many bedrooms and most living spaces are built over the garage in current housing designs. The slow boiloff of very high pressure 10,000 psi gas (mentioned above) could be hazardous.

To accommodate the extra required space, compressed hydrogen fuel tanks may have to extend either under the vehicle floorboards or in overhead roof areas, placing the fuel closer to passengers. Locating hydrogen tanks closer to passengers appears even riskier than for gasoline tanks.

Carbon fiber-reinforced plastic compressed hydrogen fuel tanks will improve. However the few occasional inevitable accidents (including some that have already occurred) could cause continuing safety concerns for compressed natural gas onboard vehicles under extreme pressures, especially since hydrogen already has a (largely undeserved) safety image problem.

To counter the need for onboard storage of hydrogen and thus eliminate altogether such safety concerns, and perhaps even more importantly, to provide greater availability of hydrogen fuel supplies during early years of introduction, auto companies are considering alternatives to pure HFCs which have onboard hydrogen reformers. These onboard reformers manufacture the hydrogen only as it is actually used in the fuel cell, thus eliminating storage and safety concerns. These reformers typically use methanol or gasoline fuel, thus reducing or eliminating fuel availability concerns. However, these reformers are inferior to pure hydrogen HFCs by virtually all other measures: emissions reductions, cost of fuel per mile, cost of vehicle, and oil import reductions.

Hydrogen storage as a hydride virtually eliminates the safety penalty as well as much of the space penalty of compressed gas storage versus gasoline; however, the tradeoff is weight and cost penalties. Stored as a compressed gas, hydrogen is on parity in weight with gasoline, as shown in Table 1. Hydrogen on an energy basis weighs only one third of gasoline. This reduces to about one seventh the weight of gasoline required in a vehicle after allowing for the estimated 2.2 times greater efficiency of the HFC versus the ICE vehicle. However, with the extra weight of the tank, compressed hydrogen storage still weighs about the same (Table 1). Light-weight 5,000 psi carbon fiber-wrapped compressed gas storage systems under development, which will store up to 10% of hydrogen by weight, will make this approximate weight parity possible.

Thus, as Table 1 shows, a 14 gallon gasoline tank, holding 13 usable gallons and capable of traveling 380 miles at 29 miles per gallon, would weigh about 102 pounds: 73 pounds of gasoline and 29 pounds of tank and related equipment. A 4.7 kg. compressed hydrogen storage system capable of the same range would weigh about the same, 110 pounds: including 10.3 pounds of hydrogen and 100 pounds of tank and related equipment. In this compressed gas form the limitation is not weight, but rather the very significant 5 times greater space, and accompanying safety concerns.

Hydrogen also faces transportation, distribution and storage problems prior to use. Transportation via tank truck of either liquid hydrogen or highly compressed (up to 10,000 psi) hydrogen is possible. However, trucking of liquid hydrogen would not be economic for widespread HFC vehicle use due to the higher costs of liquefaction, and trucking of compressed hydrogen gas would, as of now, raise problems of both safety and economic cost. Pipelines are prone to hydrogen embrittlement, and in any case, a network does not now exist for distribution of hydrogen either to service stations or to homes or industry.

The answer now being considered is on-site service station generation of hydrogen, either by steam methane reforming or by electrolysis. However, electrolysis is only an initial, interim solution, and on-site steam methane reforming adds to the local-area smog pollution, reducing some of the smog-abating benefits of HFCs.

Remote-site steam methane reformers would reduce the local-area smog pollution of HFCs to virtually zero, making them more substantial contributors to clean air in urban centers, where smog is the major concern. Remotely sited steam methane reforms could also be larger, giving greater economies of scale and cheaper costs of manufacturing hydrogen—if an economical means existed to transport such hydrogen to the point of use.

If steam methane generation or electrolysis on site at the service station is used, a practical means of hydrogen storage would enable these reformers or electrolyzers to operate "steady state," including at night when the service station is closed. This method appears more economic than the other choice to "follow load" of traffic flow.

Hydrogen can be reformed as needed from other chemicals (e.g., methanol, gasoline, or hydrocarbons) that are easier to store than hydrogen and can take advantage of existing distribution systems. However, inefficiencies, poisons, and environmental penalties partly offset these benefits.

Natural gas and other light-density fuels face the same storage problems as hydrogen, and could likewise benefit from a more practical means of storage.

Hydrogen storage methods considered above include physical storage in a compressed gas or liquefied state, and solid-state storage using gas-on-solid adsorption in materials such as, but not limited to high surface area carbon.

Activated carbon or activated charcoal is usually used for gas-on-solids adsorption. This technology works better at low temperatures. The equipment and cost of maintaining low temperatures complicate use of this technology, especially in vehicles.

Solid-state storage, gas-on-solids and metal hydrides are options which are safer technologies and they provide high storage capacity than physical storage systems. They are more expensive and heavier. Current research is aiming to determine the hydrogen adsorption/desorption properties of commercially available carbons and zeolites. Solid state storage capacities, rates of charge and discharge, thermal and mechanical effects and costs of available materials are important cost and operating parameters for hydrogen storage systems.

With gas-on-solids adsorption technology, hydrogen can be stored by being adsorbed onto the surface of activated carbon. This technology provides better volume density than compressed gas storage. The weight and volume densities of this application are comparable to liquid hydrogen systems. In a main drawback, the adsorption of hydrogen on carbon requires maintaining a temperature below 150 K (−190° F.).

A metal hydride form of hydrogen storage would reduce hydrogen's space penalty versus gasoline from fivefold to about threefold, even before considering greater vehicle design efficiencies. Even more important, storage as a metal hydride would virtually eliminate safety concerns of hydrogen storage, to even less than for gasoline. This greatly increased safety would in turn permit storage closer to passengers, thus for practical purposes in totally new vehicle designs perhaps eliminating the space limitation altogether. Seen in this light, safety concerns may be the principal reason for space limitations of compressed gas storage.

However, metal hydride systems would add 40–470 pounds more weight than gasoline (on a total system basis), depending on which of a wide range of hydride metals is used. The cost of these metals may also be significantly greater than for a carbon fiber wrapped compressed hydrogen storage tank. These weight and price penalties of hydrides have, unfortunately, more than offset their safety and volume benefits in auto engineering thinking to date.

With metal hydride technology, certain metals, alloys and other materials can be used to absorb and retain hydrogen under specific temperature and pressure conditions. They release hydrogen under different conditions. These metals are called metal hydrides when containing hydrogen. Magnesium hydrides are popular because magnesium is a relatively cheap and abundant metal and can absorb large amounts of hydrogen for its weight. Hydrides are safe and a have very high hydrogen volumetric storage capacity as compared with other methods of hydrogen storage. Unfortunately, metal hydrides are currently expensive. Currently, lower cost hydride materials require high temperatures to release hydrogen. On the other hand, hydrides which release hydrogen at lower temperatures are expensive and have less storage capacity.

A typical hydride storage system can contain several forms hydrogen at its different charging, storage, and discharging stages. A solid solution of hydrogen atoms can exist in a metal lattice or coexist with the monohydride phase of the hydride (e.g., XH, where X is a hydride-forming metal or other element). A monohydride phase can exist alone. Both monohydride phase and dihydride phases (e.g., $XH_2$) can coexist. A dihydride phase can exist alone. See, E. Wiberg and E. Amberger, *Hydrides of the Elements of Main Groups I-IV*, Elsevier, 1971, pp. 1–12. These storage mechanisms are usually different at a hydrogen-binding material's surface and in its bulk.

Hydrogen reacts with many elements to form compounds. Of these, the transition metals (Groups IIIA through VIIIA in the periodic table, including the lanthanides and actinides) are most important because they can absorb large quantities of hydrogen and form metallic hydrides. Metallic hydrides exhibit the general properties of metals, i.e., high electrical and thermal conductivity, hardness, and metallic luster. Typically hydrides are powders with average diameters of a few microns.

There are many hydride-forming materials. The terms hydride materials and hydride-forming materials are used interchangeably in this application and in many references. New alloys and other materials will allow even better hydride properties. Currently popular metal hydride systems include alloy ratios of a first metal A, and a second metal B to form $AB_5$ (e.g., $LaNi_5$), AB (e.g., FeTi), $A_2B$ (e.g., $Mg_2Ni$), and $AB_2$ (e.g., $ZrV_2$). A few examples of currently used hydrides include: $LaNi_{4.7}Al_{0.3}$, $Ti_{0.98}Zr_{0.02}V_{0.45}Fe_{0.1}Cr_{0.05}Mn_{1.4}$, $Ca_{0.2}M_{0.8}Ni_5$ (wherein M represents mischmetal), $CaNi_5$, $Ni_{64}Zr_{36}$, $Fe_{0.8}Ni_{0.2}Ti$, FeTi, $Fe_{0.9}Mn_{0.1}Ti$, $CaNi_5$, $LaNi_5$, $LaNi_{4.7}Al_{0.3}$, $Mg_2Ni$; $Mg_2Cu$, Mg, V, Ti, Zr, Th, Pd, Ca, and Li. A small percentage of another metal can be added to the alloy to affect performance. Other hydrides include non-reversible chemical hydrides such as, but not limited to $LiH_x$, AlH, NaH, and $B_2H_4$. Liquid organic hydrides include chemicals such as, but not limited to decaline, and methyl cyclohexane used with a catalyst at 200° C. Mischmetal is an alloy of rare earth metals containing about 50% lanthanum, neodymium, and similar elements.

The equilibrium pressure-composition-temperature relationships of a metal/hydrogen system can be conveniently summarized by a P-C isotherm of which an idealized version is showed in FIG. 1. Hydrogen gas pressure is plotted versus the ratio of hydride:metal. The label C can be the concentration of hydrogen or the ratio of hydrogen to metal. The P-C curve shows three distinct sections. Initially the isotherm ascends fast (section A–B) as hydrogen enters the metal lattice and occupies interstitial positions. At low concentrations of hydrogen, the composition/pressure relationship is ideal and obeys Sievert's Law:

$$H/M = K_s P^{1/2} \quad \text{(Equation 1)}$$

where H/M is the hydrogen to metal ratio, $K_s$ is Sievert's constant, and P is the equilibrium hydrogen pressure. As the hydrogen content in the metal increases, the hydrogen atoms interact (via the elastic strains introduced in the metal lattice) and the pressure/composition behavior departs from this ideality. This is reflected by a decrease in the slope of the isotherm. At a critical average hydrogen concentration, the metal/hydrogen system forms a new hydride phase (see area $C_1$ in FIG. 1). There is a discontinuity in an increasing amount of hydrogen that the metal can store. The flat, or plateau region in the P-C isotherm corresponds to the co-existence of the metal and hydride phases. To force more hydrogen into the alloy requires increasing the external gas pressure. This is represented by the rapid increase in the C-D region of the P-C isotherm curve.

In general, the plateau pressure for hydrogen loading is different from that for unloading. This pressure difference is called hysteresis. A flat plateau in the P-C curves is usually a required feature for gaseous hydrogen delivery systems to allow a large quantity of hydrogen can be stored reversibly at a constant pressure. It is important that the plateau be as wide as possible (large hydrogen storage capacity) and that at room temperature the plateau pressure be close to atmospheric pressure, since the storage container does not need to be especially strong and can thus be of light weight. Equation 1 may be affected or followed more closely by using nanoparticular hydrides instead of bulk hydrides.

The palladium/hydrogen system has been studied extensively, beginning with the early work of Graham well over a hundred years ago. Palladium is an attractive material due to its ability to readily dissociate molecular hydrogen to atomic hydrogen at its surface, but is overly expensive. Unfortunately, the direct replacement of palladium for cheaper metals or alloys is hindered because these metals form oxide or other layers and the reduced surface reaction limits the hydrogen flux into the metal.

To exploit the rapid bulk diffusion of hydrogen in the refractory metals, a palladium can be coated on a less expensive material. This allows the dissociation of the molecular hydrogen by the surface palladium layer, transport through the refractory metal bulk, and finally reassociation on the opposite surface.

In one example, the Group V metals are subject to embrittlement. However, the regime where this is a problem is well below room temperature. Should the surface palladium layer develop defects, this would not render the material useless since it would merely expose a small area of the refractory metal. Composite metal materials, such as, but not limited to plating foils of Group V metals (e.g., vanadium) with thin layers of palladium, are known. While it is clear that viable composite metal materials in larger scales have been constructed, improvements of the process are still required to make these structures more efficient. Removal of the refractory metal surface oxide layer is important to ensure hydrogen flux into the metal. Various chemical and mechanical techniques have been used to achieve this, but most allow regrowth before coating with the top palladium or palladium alloy. Another concern is the quality of the palladium or alloy layer.

The hydriding reaction proceeds inwardly from the surface of the alloy (Reilly, J.; *J. Sci. Amer.* 242(2), 2, 6 (1980)). Cracks and fissures are created, increasing the surface area. However, this surface area is probably still much lower than present in nanophase materials. Porous hydrides are described by Congdon in U.S. Pat. No. 5,443,616.

In the past several years nanophase materials, including metals and ceramics, have begun being designed and manufactured. These have dramatically different characteristics than their precursor (parent) materials, making them act almost like new materials. These different characteristics can be customized by controlling the size, as well as shape and crystalline character of the nanophase grains. For example, see Richard W. Siegel's review in "Creating Nanophase Materials," *Scientific American*, December, 74–79 (1996).

Nanoparticles include atomic clusters, molecular clusters, agglomerates, micelles, and other particles with nanometer dimensions. Nanoparticles are usually made by such techniques as chemical vapor deposition (CVD), physical vapor deposition (PVD), physical vapor synthesis (PVS), reactive sputtering, electrodeposition, laser pyrolysis, laser ablation, spray conversion, mechanical alloying, and sol gel techniques. New, lower cost methods are being evolved from these and similar means of production. In general, nanoparticles can be synthesized from atomic or molecular precursors or by chemical or physical means.

Many materials with some nanoscale feature (e.g., crystals or grains) are often confusingly called nanoparticles, whereas in fact they are larger composite structures with some nanoparticle features. These large structures should be called nanostructured materials, nanostructures, or nanomaterials. For example, Ovshinsky describes hydrides made of nanocrystallites in U.S. Pat. No. 5,840,440. However, these nanocrystallites only describe the size of the crystals making up the continuous hydride bulk structure. These crystallites integrally form the bulk material. There are no separable nanoparticles in these hydrides.

Two other examples use mechanical alloying by ball milling. Alloying nanoscale particles by ball milling was studied by Holtz and Imam [*J. Mater. Sci.*, 32 (1997) 2267]. However, the resulting product was pressed into large pellets. Song describes agglomerates with isolated grains of submicron $Mg_2Ni$ hydrides created by ball milling [Song, Y. M., *Int. J. Hydrogen Energy*, 20(3) 221–227]. However, it appears that most of the isolated grains are components of larger particles or agglomerates as depicted in his electron micrographs. Moreover, size of the particles is measured by lower resolution scanning electron microscopy, which depicts a macrostructure with small microfeatures, and Song does not differentiate between agglomerates, grains, and individual particles.

Singh, et. al. [*J. Alloys and Compounds*, 227 (1995) 63–68] describes more extensive ball milling with smaller primary particles. However, his TEM shows that the majority of these small primary particles are combined into parts of larger aggregates. Due to the high energy imparted by mechanical alloying, the nanoparticles are fused together into larger alloyed aggregates. Such extensive ball milling is expensive.

Imamura, et al. [*J. Less-Common Metals*, 135 (1987) 277] describe making small hydride particles by evaporating magnesium into an atmosphere containing THF. This method can theoretically engineer a separation of the nanoparticle metals, but is not clearly demonstrated to do so in this instance. Imamura only roughly estimates particle size based on surface areas calculated by BET surface analysis. This assumes perfect spherically shaped particles with no surface roughness. Imamura did not know the number of such particles in the sample, their packing, their shapes, agglomerations, or their size distribution. Methods of estimating average particle size distribution are not amenable to particles this small because of numerous measurement problems. BET can be used to measure pore sizes due to their surface area, but cannot measure particle sizes of loose powders. For these reasons BET is especially not suited for measuring nanoparticles due to numerous measurement problems. Again, grain sizes or solvated solids within a THF medium are described instead of discreet nanoparticles. This THF work describes metal particles held together by THF to form THF-impregnated aggregates or wet agglomerates by an expensive vacuum process. The primary particles are not significantly separable into discrete nanoparticles.

Carbon or graphite nanotubes are a nanomaterial that has been investigated for hydrogen storage. Most nanotubes have a submicron wall thickness and sometimes a diameter. Critical dimension is the smallest dimension of an object. The length of nanotubes is usually approximately a micrometer (micron). The smallest nanotube diameters are still much larger than interstitial sites in hydrides.

Carbon nanotubes trap hydrogen within the inside diameter of the nanotube or as gas-on-solid adsorption. In a big difference, hydrides chemically store hydrogen at least partly within their bulk within interstitial sites between metal atoms.

Carbon nanotubes may have other drawbacks. They are expensive to manufacture and especially to purify. They could potentially create an explosion hazard in an oxygen environment. Also, they usually need to be kept at low temperatures in order to retain hydrogen.

Current hydrogen storage technology focuses on macroscale hydrides, carbon nanotubes, compressed hydrogen and cryogenic liquid hydrogen. Instead of just improving these existing systems, it would be beneficial to take an entirely different approach.

SUMMARY OF THE INVENTION

This invention stores fuels with nanoparticles that can at least partially chemically react with hydrogen or optionally other low density fuels. In the preferred embodiment, relatively pure, alloyed or composite metal nanoparticles can at least partially react with hydrogen gas to form essentially reversible hydrides. Nanoparticular hydride-forming materials of the present invention can broaden the range of economic materials, improve performance of them, and thereby lower the costs and improve the economics of hydride storage systems. For many hydride materials, the high surface to volume ratio of nanophase particles enhances hydrogen absorption and desorption rates, reduces external energy (e.g., waste heat) required for hydrogen desorption, improves other performance characteristics, and reduces the hydride weight and often volume per unit of stored hydrogen, thus both broadening the range of materials that can be used and enhancing their performance characteristics.

DETAILED DESCRIPTION

This invention relates to improving performance, cost, and range of possible materials, of hydride storage by using nanoparticles of hydride-forming materials. Nanoparticles are defined in this invention to include any condensed phase having an average equivalent diameter within about 2 to 200 nm (nanometers). This invention can include nanoparticles that are attached to each other to form essentially dry agglomerates while maintaining most of the surface area of the nanoparticles.

This invention improves hydrogen absorption and desorption rates, as well as temperature and pressure relationships. Faster absorption decreases hydrogen loading/charging times. Faster desorption decreases lag time. This is particularly important for automobile acceleration and for the lag times characteristic for hydrogen reformers. If methane, gasoline, or some other fuel is reformed into hydrogen, a small fast hydride system like the present invention could be incorporated with a larger cheaper and slower hydrogen storage system. This combination would give better overall performance by ensuring a steady hydrogen supply to the fuel cell.

Hydride performance, and often storage, improves by decreasing the distance hydrogen has to permeate into a hydride material. For example, hydrogen absorption/desorption rates and loading ratios improve with higher hydrogen transfer rates. Many current systems achieve higher hydrogen transfer rates due to cracks that form in the hydride materials. Nanoparticles offer the best possible ratio of surface area to volume. This is important in hydride-forming materials such as, but not limited to FeTi alloys that bond hydrogen to their surface. Therefore, hydrogen transfer rates will be normally higher in nanophase hydride particles than in any other form of the same hydride. Only changes to the hydride-forming material's internal structure (e.g., crystal structure) will cause deviations from this general trend. Smaller sizes should also reduce hydrogen release and uptake temperatures and/or pressures for hydrides, and increase speed of performance.

This invention improves storage, by increasing catalytic sites and hydrogen to metal ratios, or by expanding the range of metals that can be used. By packing in more hydrogen per weight of metal, hydrogen storage density is improved. This enables a practical way of storing hydrogen onboard vehicles or at its other possible points of end use, and its more efficient generation at stationary sites, including larger, more efficient remotely located sites.

By having a very large surface area, nanoparticles offer fantastic surface chemistry. Hydrides systems based on nanoparticles can store a significant amount of hydrogen on surface sites in addition to its storage in interstitial sites (e.g. in palladium). The small particle sizes can increase storage density. Nanoparticles can be coated to enhance this surface chemistry. For example, nanomaterials could be coated or partially coated by gas or liquid phase processes during the formation of the nanomaterial. Dry coatings such as, but not limited to alkyl silanes and alkyl thiols can also help reduce powder loss or powder blow out during use.

Nanoparticles should also increase the number of catalytic sites in the hydride storage system. This should allow the use of both amorphous and crystalline materials with high storage densities. Small size can also create catalytic activity not present in precursor or bulk versions of the same material.

This invention expands the range of materials that can be used to include cheaper or lighter materials, by improving various performance characteristics that had previously left such materials inadequate for practical hydride storage usage. The nanoparticles of the present invention not only can increase kinetics and/or improve storage density with more catalytic sites, but can also allow uses of cheap and/or light previously inefficient hydrides. Magnesium, nickel and iron alloys are non-exclusive examples. Waste or cheap materials capable of partially forming hydrides such as some minimally processed ore, misch metals, or junk ore could be used in situations such as stationary storage.

Materials that are now considered top candidates for hydrides, but which have nevertheless not yet reached the stage of broad commerciality, include magnesium hydride ($MgH_2$), magnesium-nickel hydride ($Mg_2HiH_4$), iron-titanium hydride ($FeTiH_{1.95}$), and lanthanum-pentanickel hydride ($LaNi_5H_7$). Nanophase versions of these and other metals, including those cited previously, and alloys and/or compounds thereof, can both expand and improve the range of materials and operating and economic characteristics of the resulting hydrides, bringing them to commerciality.

Palladium type metals form excellent hydride storage systems, but are very expensive. Less expensive hydride systems suffer from lower hydrogen loading ratios and lower hydrogen permeabilities. Nanophase hydride-forming materials allow using cheaper hydrides with lower permeabilities as well as giving better performance in expensive hydrides. Nanoparticles can be formed already in hydride form or in a form ready to adsorb hydrogen. For example, either palladium or palladium hydride nanoparticles could be synthesized.

Reducing cracks can improve hydride characteristics in various ways. Cracks create less surface area than possible with nanoparticles. Minimizing cracking should decrease required volume of the storage system, and increase possible charging/discharging cycles. Minimizing cracking also prevents deformation or degradation of the hydride material. Due to their available high surface areas, nanoparticles should allow the use of more elastic hydride-forming materials that do not crack well. Nanoparticle size should also affect the temperature of hydride formation and decomposition.

The nanoparticles typically have different properties than the precursor from which they were made, thereby broadening and improving the range of possible materials. This is largely due to their large surface area. Other reasons such as, but not limited to quantum effects and morphological changes will also affect nanoparticle properties. Surface enrichment is also enhanced. Catalytic activity for hydrogen uptake and release is also enhanced. Nanoparticles can also change their form or shape more than larger particles. The small size could minimize cracking or deformation in metals that form flakes after absorbing hydrogen.

It is an object of this invention to create additional parameters for designing hydrogen storage systems. Nanoparticles' diameter, shape, crystalline structure, material, alloying, morphology, and other intrinsic properties can be controlled, and can be combined with the selection of materials, mixtures, and alloys to drastically increase the permutations and combinations of possible hydrogen storage systems. The result should enhance prospects for commerciality.

It is a further object of this invention to take advantage of this separate emerging new technology to create nanophase hydrides that can store greater quantities of hydrogen, both by volume and by weight, than can their precursor, standard hydrides; that can greatly broaden the range of available materials for hydrides; and that can improve or optimize some or all of the various other hydride storage properties, such as, but not limited to materials costs, flow rates, speed of response, pressure and temperature relationships, and various other operating characteristics of hydride storage systems.

Nanoparticle size ranges can be chosen based the type of material used, the surface area generated both by the size and the fabrication method, gas flow, powder flow, packing, and/or cost of manufacturing. Nanoparticles of different sizes and shapes can also be used together.

It is a further object of this invention to improve the space, weight, and/or safety of hydrogen storage and HFC systems. Space, weight, and safety penalties are the biggest reasons hydrogen fuel is not already in widespread use, whether in vehicles, stationary power, or portable power applications. The current invention aims at lessening these critical negatives. As another way of reducing weight and costs of hydrogen fuel systems, this invention also allows the use of inexpensive and light low-pressure tanks; these are a major source of extra weight as well as cost in hydrogen gas or liquid storage systems.

It is a further object of this invention to improve the range of materials available for hydrides. Certain materials that have a high ability to store hydrogen by weight and volume, such as, but not limited to magnesium hydride ($MgH_2$), may be inferior in some other operating characteristics in the precursor form, but in nanophase form may have equal or exceed alternative materials in these other operating characteristics. The entire matrix of materials selection is thus changed and broadened by the introduction of nanophase materials to the menu of materials to choose from.

It is a further object of this invention to improve operating and economic characteristics of hydride systems. The ability to custom design nanophase grain diameter, shapes, and crystalline structure, together with the many combinations of materials, mixtures, and alloys of materials useful for hydrides, not only boosts hydrogen storage capability by weight and volume density, but also greatly broadens the available range of materials and properties available. The result permits optimizing some or all of the various other hydride operating and economic characteristics, such as, but not limited to materials costs, flow rates, speed of response, pressure and temperature relationships, and various other operating characteristics of hydride storage systems.

In this invention's preferred embodiment nanophase materials store hydrogen as a hydride. Various combinations of nanophase diameters and nanophase materials or combinations of materials, including mixtures and alloys of materials with the same or different nanophase diameters, can be designed to optimize at least many or combinations of the following characteristics of hydride storage systems:

Weight Density; i.e., the total weight of the hydrogen and hydride metal in terms of deliverable energy stored. While the density of hydrogen by volume in a conventional hydride is high, the density by weight is much lower because of the weight of the associated metal. Conventional hydrides at best are about four to five times heavier than gasoline because of the weight of the metals; the penalty would be still greater except that hydrogen alone has three times the energy density of gasoline. Weight is especially important in the performance of an automobile, or any other hydrogen transport system (e.g., transportation of hydrogen by truck). Nanophase metals for hydrides can substantially increase the weight density of hydrogen storage.

Volume Density; i.e., the total volume of hydrogen stored in a volume of hydride, in terms of deliverable energy content. At best, some conventional hydrides can store as much as a half the volume of hydrogen as the equivalent energy of gasoline. While this is up to twice the amount of hydrogen that can be stored in liquid form, and is about three times the hydrogen that can be stored as a gas at 5,000 psi, it nevertheless still represents a space penalty of at least twice that of gasoline. The space requirement is especially critical in the design of an automobile, or any other hydrogen transport system (e.g., transportation of hydrogen by truck).

Nanophase materials for hydrides can increase the volume density of hydrides in two ways: (a) storing a greater percent of hydrogen in the metal owing to the far greater surface area of the nanophase metal particles; (b) engineering more volumetrically absorbing metal compounds that can store the hydrogen as a hydride. Optimal solutions for these characteristics can be engineered owing to the different characteristics of nanophase versus conventional materials, and the wider range of materials available through different combinations of nanophase diameters and nanophase materials or combinations of materials.

(c) Materials Cost: While nanophase hydrides entail greater cost of manufacture, their use broadens out the range of materials that can form hydrides, as well as the range of properties thereof, to permit both less expensive precursor (parent) materials, and equal or more economic performance characteristics from these materials, as listed in the other parts of these claims. Either through the cheaper materials, their greater performance, or both, economics of hydride storage systems can be improved. This and the other specific hydride performance characteristics can be optimized via the different characteristics of nanophase versus conventional materials, and the wider range of hydrides available through different combinations of nanophase diameters and materials or combinations of materials. The current cost to make nanophase materials should decrease in the future. Also, nanoparticles compare favorably to the high cost and limited availability of palladium.

(d) Flow Rates; i.e., the rates at which hydrogen discharges from the hydride when the heat of decomposition is applied. The flow rate of release of the hydrogen benefits from the smaller particle sizes of nanophase particles, giving more avenues for exit of the hydrogen gas. The speed of response upon reaching of the heat of decomposition likewise benefits for the same reasons. The heat of decomposition is the heat required to begin releasing the hydrogen as a gas.

(e) Speed of Response; i.e., the speed at which hydrogen gas begins to flow upon reaching the heat of decomposition. The speed of response, i.e., quicker thermodynamics, is critical to a smoothly functioning vehicle power system. This and other specific hydride performance characteristics can be optimized via the different characteristics of nanophase versus conventional materials and the wider range of materials available through different combinations of nanophase diameters and materials or combinations of materials.

(f) Plateau Pressure; i.e., the flattish region of the S-shaped curve of volume of hydrogen absorbed in the hydride versus pressure (at a constant temperature). This is the region in which most of the hydrogen is absorbed with little pressure change. This S-shaped curve of hydrogen absorption versus pressure, plotted at a constant temperature, is known as an isotherm, an example of which is depicted in FIG. 1; at higher temperatures, approximately the same curve shifts higher. Plateau pressure for a given temperature can be engineered in conventional hydrides by the selection of metals, alloys, and intermetallic compounds; with nanophase materials the plateau pressure can be further tailor-designed by the choice, mixtures, and alloys of materials and can be supplemented with different nanophase diameters of same.

(g) Plateau Pressure-Temperature Relationship; i.e., the temperature at which isotherm pressure plateaus occur. The temperatures can be raised or lowered by the choice of materials in conventional hydrides, sometimes at the compromise of other properties such as, but not limited to volume. Further ranges of flexibility can be obtained with nanophase materials with the selection of nanophase diameters, eliminating or reducing any compromises of other properties. This invention can reduce external energy (e.g., waste heat) required for hydrogen desorption from hydrides.

(h) Plateau Slope; i.e., the (usually modestly rising) slope of the plateau region of the above curve, or isotherm. This can be flattened in conventional hydrides with the appropriate annealing treatments prior to crushing and activation. Many nanophase hydrides should not need this activation step. A surface or sublayer can be added to the nanoparticle to replace or minimize activation. The same effect can be accomplished with nanophase size particles, and the choice of nanophase diameters and materials combinations can further aid in designing the plateau slope. A separate annealing step should not be needed for nanoparticles.

Hysteresis; i.e., the pressure difference between absorption and desorption isotherms, or the difference in pressure to absorb versus to desorb hydrogen from a hydride. This asymmetry varies between alloys and must be taken into account in designing a system, especially when different hydride beds are to be coupled in closed cycle operation. Dual bed or multiple bed systems can combine characteristics of specific hydrides for more economical or efficient overall system. A hybrid storage system is envisioned as part of this invention. A nanophase component could be used for quick response in combination with a component of partly larger particles for potentially higher storage density with a slower response (dual bed, see Daimler-Benz in Sci. Amer., p. 7). Nanophase hydrides with their greater combination of diameters and materials can further tailor-design the hysteresis of a hydride.

(j) Ease of Activation; i.e., of hydriding the alloy for the first time. Some alloys can be activated quite easily even at ambient temperature; others are difficult to activate apparently because of a surface barrier that must first be eliminated. Nanophase materials may directly address the latter problem, but in addition afford a broader range of materials for hydrides, and nanophase diameters of same, thus giving greater flexibility for dealing with ease of activation.

(k) Withstanding Poisoning, or Deactivation, with Impure Gas Streams; e.g. from air, carbon monoxide, and sulfur dioxide. Different compounds have different degrees of tolerance for such. Nanophase materials, by giving greater combinations of diameters and materials, can further tailor-engineer to minimize this problem, boosting the flexibility and performance of the hydride.

The nanoparticles of the present invention could be used as a getter to clean hydrogen or other fuels before or during use in fuel storage, reforming to hydrogen, or in HFCs themselves, to minimize poisoning of hydride-forming materials, catalysts, or electrodes. Catalysts are found in storage, reformers, and electrodes. A mixture of nanoparticles could include hydrides and getters. Alternatively, a small exchangeable and/or regenerable cartridge of nanoparticles could effectively remove poisons from hydrogen, gasoline, methanol, other fuel, or air. For example, oxygen can be getted to increase hydrogen storage levels, and platinum-ruthenium alloy catalyst can be used to prevent poisoning in methanol converters.

(l) Longer Cycle Life; i.e., ability to absorb and desorb the same quantity of hydrogen many times without deterioration.

(m) Other Characteristics. Other properties and characteristics which are taken into account in conventional hydrides can be further tailor-engineered with nanophase hydrides, given their greater combinations of diameters and materials to choose from.

Any nanoparticle fabrication processes that can be cost-effective for mass production are envisioned. Some representative examples follow. This invention envisions creating hydrogen-storing nanoparticles using any of the many nanofabrication techniques that are being found now and in the future. Representative examples include:

Flame reactors typically form oxides and chlorides that could be precursors for hydrogen storage materials. Spray roasting and hot wall could be examples.

Combustion synthesis uses an oxidizer (e.g., metal salts) and a fuel (e.g., organic compounds) in a redox reaction. This method creates loosely agglomerated nanoparticles with a high production rate and cheap raw materials.

Evaporation/condensation (EC) generators have a low production rate due to low operating pressures (usually a few Torr), but potentially could be scaled up like aluminized Mylar sputtering applications were.

Spray pyrolysis, plasma processing and powder spray could be used in conjunction with a supersonic nozzle.

Liquid phase methods could use solution chemistry such as supercritical fluids, chemical reduction, or chemical oxidation.

Mechanical alloying for hydrides is not considered as part of this invention unless it is used in combination with another process. Ball milling and other mechanical alloying predominantly create aggregates larger than the nanoparticles of this invention.

Template methods form nanoparticles within small voids or areas. Zeolites, pillared clays, nanoporous membranes and inverse micelles (e.g., water in oil) are non-exclusive examples.

Prior work in this field used very expensive and slow procedures and not of interest in this invention, which seeks to provide lower cost, potentially commercial hydrides. Prior work using the term "nano" seem to be larger particles with nanostructured features such as crystal size.

The nanoparticles and ultrafine powders of the present invention may be subject to many different names and definitions since we are still in the early development of nanotechnology. This invention uses the following definitions.

This invention uses particles with many different shapes. Some generic examples include spheres, hollow spheres, flakes, whiskers, isolated crystals, etc. The size of these particles are usually measured as equivalent spherical diameters. That is the diameter of a sphere with the same volume as the particle in question. This invention uses particles with equivalent spherical diameters of about 2–200 nm. We define these particles as nanoparticles.

Nanoparticles often attach to one another by at least one of several mechanisms. Nanoparticles can be physically attached to form a large aggregate or bulk material. Aggregates are usually not of nanometer scale, but can be made of what were originally nanoparticles fused to one another. For example, normal sintering can fuse the original nanoparticles. Aerogels are very low density aggregates of nanoparticles. Bulk materials can be made up of nanocrystallites. These aggregates and bulk crystallite materials may have originated from nanoparticles, but are not part of the present invention.

This invention does include agglomerates which are nanoparticles that are only held together by van der Waals forces and other surface forces of attraction, and includes other essentially dry agglomerates of nanoparticles. The invention also includes light sintering or pressing while preserving at least 50%, but preferably at least 75%, of the surface area of the nanoparticles. Unlike aggregates, agglomerates can be broken apart mechanically and/or by colloidal suspension, often but not exclusively into their separate nanoparticle sizes.

This invention can include nanoparticles that are attached to each other to form a larger structure while maintaining most of the surface area of the nanoparticles. Representative examples include nanoparticles incorporated into and/or on a hydrogen permeable and/or porous membrane.

The nanoparticles of this invention must be carefully held to avoid losing the very fine powder. However, it is known that these particles may loosely bind or agglomerate together because of their large surface area. This method could provide the greatest storage and storage density at the lowest cost. In addition, the nanoparticles can be bound to each other (e.g., by a binder), a membrane, other substrate, or be held by an at least partially hydrogen permeable container. For example, a spiral wound Pd-coated sheet of cheaper hydriding material could be used inside a tank. The sheet could be hydrogen permeable or selectively hydrogen permeable, the latter keeping out or getting poisons or impurities. In another example, a rigid tank with an internal flexible bladder could hold a hydride and hydrogen separated from methane with a selectively hydrogen permeable bladder. Alternatively, gasoline could be separated from the hydride/hydrogen. Packing of particles will affect the cycle time and efficiency.

Fluid beds are also envisioned. The nanoparticles could be agitated in a fluid bed during hydrogen charging, or for longer times. For example, agitation could be provided by a vehicle's drive train or shocks.

This nanoparticles of the present invention can be lightly pressed and or sintered into shapes if the majority of the nanoparticles' surface area remains. This could reduce motion and loss of the nanoparticles.

Mixtures of different hydrides is also envisioned. Different materials, hydride forms, crystal structures, sizes, and shapes are envisioned. For example, carbon monoxide and sulfide scavengers could be mixed with hydride storage nanoparticles or could be used as a prefilter at any point along the production, storage, distribution, and use. Examples include but are not limited to removing sulphur from gasoline before reforming, removing sulphur from hydrogen before filling a hydride tank, and removing oxygen at the inlet to a fuel cell. Mixed fuel storage is envisioned. Separation of fuels, such as, but not limited to hydrogen from methane in a gas well is also envisioned.

Non-hydride nanoparticles could also be mixed with the hydride-forming nanoparticles. Some reasons for these mixtures can include enhancing thermal properties, acting as poison getters, improving flow characteristics, binding particles to minimize their loss with gas flow, catalysis, and/or creating channels for gas flow. Some examples of non-hydride nanoparticles include silica sol, ceramic nanoparticles, semiconductor nanoparticles, and/or light sensitive materials. Nanoparticles with different hydride-formation properties can also be mixed together.

Nanoparticles of the present invention can also be mixed with conventional macro-sized hydrides to improve catalysis or modify the hysteresis curve.

Esoteric materials such as, but not limited to mischmetal alloys, junk ore, precursor metal mixtures recovered from ore, polyhydride complexes using cobalt or other transition materials, and organosilicones are envisioned components of the nanoparticles of the present invention. Polyhydrides can usually store more hydrogen monohydrides. Many catalysts (e.g., palladium) that bind hydrogen can also be used for storage or to coat hydride particles to improve storage kinetics and capacity.

Hydrogen can be released from the nanoparticles by changes in temperature, electricity, magnetism, pressure, chemicals, electrochemistry, pH, volume (e.g., injection into an ICE), etc. Parameters will often be different than in the conventional bulk hydride systems.

The nanoparticle surface can be altered to affect surface poisoning. Generally, surface poisoning is a problem in hydride storage. Carbon monoxide and sulfur compounds are common problems in palladium type systems. Due to its high surface area, the nanoparticle in this invention should be protected from poisoning gases. Alternatively, the nanoparticle's contents or at least surface can be selected to be resistant to poisoning during use in its intended application.

Buildup of surface coatings such as, but not limited to oxides can reduce hydrogen permeation. Due to their high surface area, the nanoparticles in this invention must be designed to have minimal surface barriers. For example, the particles could be kept in an inert atmosphere. Or heating nanoparticles and/or nanoparticle hydrides in pure hydrogen can remove oxide surface layers. Nanoparticles can also be coated to minimize oxidation. Preferably oxide regrowth is prevented before coating.

The nanoparticles can be porous to further enhance surface area. However, too much porosity will reduce storage density especially when hydrogen is mainly stored in the bulk of the nanoparticle.

The nanoparticles can be virtually pure, alloys, coated particles, multilayer particles, or mineral combinations.

In the present invention, hydrogen, other fuels, or liquids can be stored in the spaces between the particles (compared to the interstitial sites of hydrides), for applications including but not limited to storage, blending gases, safety, or getter applications. The surface of the nanoparticles can interact with the stored material. The stored material can be held by capillary action, hydrogen bonding, and other chemical bonding and physical interactions. For example, a mixture of solid hydride nanoparticles can be mixed with a liquid such as, but not limited to gasoline or methanol. Adding 5% hydrogen to gasoline decreases $NO_x$ emission by 30–40%. Hydride nanoparticles can be mixed with other materials to provide a hydrogen mixed with other gasses or vapors upon request. Non-hydride nanoparticles (e.g., polymeric) can be mixed with volatile liquids to reduce evaporation rate, thereby minimizing explosion and flammability risks.

Condensation in capillary inter-particle spaces between nanoparticles allows fast hydrogen permeation. These spaces could also store condensable gases as an additional storage mechanism.

Methane can be reacted with nanoparticles, such as in a metal carbide system, to provide a safe way of storing natural gas and other low density hydrocarbons. Storing other low density fuels in similar ways, including but not limited to propane, butane, ethane, natural gasoline, and LNG, are also envisioned.

Additives can be added to the hydrogen either in storage or from other sources to improve storage, fuel cell performance, emissions, etc. The nanoparticles could be designed to be compatible with such systems.

Alternatively, nanodroplets of or containing liquid hydrides or hydride precursors could be used for storage of chemical hydrides. For example, nanodroplets of decaline or methyl cyclohexane with or without a separate catalyst are envisioned. The catalyst could be incorporated in the nanodroplet or may not be needed due to the nanodroplet size. The nanodroplets could be created before distribution in the infrastructure system or could be created in situ in a vehicle just prior to burning in an ICE, or other oxidation such as a fuel cell. Explosive parameters such as, but not limited to carbon content would dictate which combinations would be safe. Solid chemical hydride nanoparticles, such as sodium aluminum hydride or calcium hydride, are also envisioned.

Application of this invention include the following. Storage is permitted throughout the hydrogen usage system. Hydrogen can be stored in nanophase hydrides as a means of on-board vehicle storage for vehicles powered by a hydrogen fuel cell, or as a means of storing hydrogen at service stations, garages, central fleet refueling stations, even individuals' homes, or other points of use, before use by vehicles. The source of such hydrogen could be on-site generation, either by electrolysis or by steam methane reforming; or alternatively, off-site generation, delivered by truck or pipeline; or even produced in individuals' homes or other points of use, where the safety of hydride storage could permit hydrogen generation. Minimizing weight and especially volume are major requirements for non-stationary applications.

For any of these sources of generation, more flexible and/or economic hydrogen generation is permitted. The hydrogen can be stored in nanophase hydrides, thus permitting capturing the economies of either continuous around-the-clock generation for steam methane reforming, or of off-hours evening generation when electric rates are lower for electrolysis.

Nanophase hydride storage can permit transportation of hydrogen to service stations or other distribution points from remotely located large steam methane reforming hydrogen production systems. These would be cheaper due to economies of scale, and more environmentally friendly since they reduce to nearly zero the local, urban-area smog pollution of HFCs in urban areas, where smog is a problem.

Hydrogen can be stored in nanophase hydrides and transported in trucks or rail to market for tapping renewable and zero-pollution hydrogen energy supplies, which are typically remote from the points of use, such as, but not limited to biomass, municipal waste, or electrolysis of water using solar, (PV or solar-thermal-electric), wind, or hydro electricity. Hydrogen can be stored in nanophase hydrides and transported in trucks or rail to market for harnessing currently experimental hydrogen production techniques, among them being photobiological processes, photoelectrochemical processes, thermochemical processes, and radiolysis.

For onboard vehicle use, hydrogen can be stored in nanophase hydrides in vehicles fueled with methanol or gasoline with onboard hydrogen reformer systems, which have some speed of delivery problems. In this application hydrides, using nanophase materials, can store excess hydrogen at stop lights or other stops and deliver this excess in the first seconds of acceleration, taking out the delays of response of the on-board reformer systems.

For distribution, hydrogen can be stored in nanophase hydrides in bulk storage, required in large scale hydrogen distribution systems to provide a buffer between production facilities and fluctuations in demand.

For non-vehicular uses, hydrogen can be stored in nanophase hydrides for storage, transportation, and use in stationary power hydrogen fuel cell systems, whether using PEM or other fuel cell systems. Hydrogen can be stored in nanophase hydrides as a means of storing, transporting, and using hydrogen safely, conveniently, and economically for residential, commercial and industrial uses, and for transporting it to these points of use. Storage and transportation of hydrogen in nanophase hydrides can be used for storage, transportation, battery replacement, and use in fuel cells for portable power products (e.g., laptop computers, mobile phones, or other portable appliances) and portable fuel cell demonstration systems for marketing or educational purposes.

Nanophase hydrides can store hydrogen for storage, transportation, and use in: hydrogen-burning appliances (such as, but not limited to ovens, ranges, barbecue grills, fireplace "logs," hydrogen-fired clothes dryers); hydrogen-fueled internal combustion engines; marine applications, including ship propulsion and on-board electricity generation; and aviation or space applications, utilizing the lighter weight, lesser volume, and greater safety characteristics of nanophase hydrides.

Nanophase hydrides can be used in chemical and industrial industries and these industries' applications (e.g., production of ammonia, refining of petroleum products, production of methanol and other chemicals, for food hydrogenation, ironmaking of steel and glass, and in the electronics industry), giving greater flexibility than at present, in which hydrogen's use must typically now be geared more closely to its production than would be required with a more economical and effective storage and transportation system via nanophase hydrides.

Nanophase hydrides can store and transport hydrogen from cleanup of industrial off-gasses, which hydrogen is now used principally on-site by the industry that produces it, but might more valuably be used in other markets given an economic and effective storage and transportation system via nanophase hydrides.

This invention can eliminate or reduce the need for electrical transmission systems in developing countries by converting electricity to hydrogen at the point of generation, and storing and transporting the hydrogen to the point of end use via nanophase hydride transported by trucks, trains, or other existing infrastructure. The same application could apply in new or replacement energy transportation systems in developed nations.

Applications of this invention are also envisioned to include any other applications in which hydrogen is stored or transported, hydrogen purification, hydrogen recovery, methane recovery, natural gas recovery, hydrogen separation, thermal compression, chemical heat pumps, refrigeration without CFCs, deuterium and/or tritium enrichment, and energetics.

These advantages made possible by this invention should greatly facilitate and accelerate the adoption of hydrogen for fueling vehicles, whether via HFCs or hydrogen ICE designs, by making possible more compact, safe, lower-cost, lower-weight on-board hydrogen storage. Likewise, the same advantages should similarly greatly facilitate both the transportation and end-point distribution of hydrogen, as well as storage following generation, further facilitating and accelerating the adoption of hydrogen for vehicles. The same advantages should likewise apply to HFCs for stationary power use and associated hydrogen storage prior to use, storage during transportation and distribution, and storage following generation. These same advantages should likewise accrue to HFCs for portable power products.

This invention should help provide such a more economic means of transportation and distribution of remotely generated hydrogen. It would offer a transportation method similar to that of tank trucks for gasoline or heating oil, but more economic than would now be possible via trucking liquid hydrogen or compressed gas hydrogen.

An example would be to store and/or transport liquid hydrogen more safely by slowing gasification of the hydrogen. Hydrogen would be stored as a hydride in the nanoparticles and on the surface of the nanoparticles. Hydrogen would also be stored as a liquid between the particles and held by capillary action, etc. This liquid hydrogen between the particles should behave differently than bulk liquid hydrogen because of its interaction with the close surfaces of the nanoparticles. Potentially, higher temperatures and/or less refrigeration may be possible. Another example would be to store and/or transport liquid natural gas (LNG) in and between absorbent polymer nanoparticles. This would slow the rate of release of gaseous natural gas during tank leakage or rupture. Slowing release of these gases should minimize explosions, freezing and asphyxiation dangers. These examples also should allow less stringent refrigeration and storage vessels.

Since there are emission benefits to be derived from hydrogen additives versus pure gasoline, a more practical alternative would be mixing up to perhaps 20% compressed hydrogen with gasoline in the carburetor or engine itself. For any of these possible hydrogen ICE applications a method would still be required for hydrogen storage, both onboard the vehicle and prior to its use. Hydrogen could be mixed with oxygen within narrow safe ratios. Hydrogen could be mixed with water to improve ICE performance. Safety concerns have to be addressed when mixing hydrogen with carbon or oxygen.

This invention includes the following materials, systems, and uses. A material for storing hydrogen as a hydride, wherein the material comprises a non-graphitic nanoparticle capable of storing hydrogen as a hydride, adsorbed hydrogen, or combination thereof, said nanoparticle having an average diameter of about 2 nanometers to about 200 nanometers. A material for storing hydrogen as a hydride, wherein the material comprises a mixture of particles capable of storing hydrogen as a hydride, wherein essentially all of the particles have at least two dimensions of at least about 2 nanometer and no more than about 200 nanometers. A material for storing hydrogen as a hydride, wherein the material comprises a mixture of nanophase particles, with an average diameter of 2 to 100 nanometers. A material for storing hydrogen as a hydride, wherein the material comprises a mixture of nanophase particles, with an average diameter of 100 to 200 nanometers. A material for storing hydrogen as a hydride, wherein the material comprises a mixture of nanophase particles, with an average critical dimension of 2 to 80 nanometers. A material for storing hydrogen as a hydride, wherein the material comprises an aggregate of nanomaterials, wherein the aggregate has an average critical dimension of 15 to 200 nanometers. A hydrogen storage material, which comprises a non-graphitic nanomaterial with a critical dimension less than 40 nanometers. A hydride, which comprises a nanomaterial with a critical dimension less than 100 nanometers. A hydrogen storage material, which comprises a material according to claim 1 and a second material having all of its dimensions greater than about 200 nanometers, said second material being at least one member selected from the group consisting of a hydride-forming material, a hydrogen adsorbing material, a support, and an additive to enhance performance of the hydrogen storage system. A material for storing hydrogen as a hydride, wherein the material comprises a nanoparticle capable of storing hydrogen as a hydride, said nanoparticle having an average diameter of about 200 nanometer to about 950 nanometers.

The materials of this invention can catalyzes the splitting of molecular hydrogen to atomic hydrogen, can be a dry metal, can be coated (e.g., by a oxide or poison resistant coating), and can be on a support (e.g., membrane, sponge, etc.). The materials of this invention have at least two different sizes or can be a mixture of at least two different nanoparticles made of different materials. The materials of this invention can comprises an alloy, junk ore or a precursor metal mixtures recovered from ore. The materials of this invention can comprises a liquid nanodroplet of a chemical hydride.

The materials of this invention can be in a gas, in a vacuum, or in a liquid. The nanoparticles of this invention can be crystalline and/or amorphous.

The materials of this invention can be used in storage systems comprising any of the following: the material of claim 1 in a first container, and a slower and cheaper hydrogen storage system in a second container; a support for holding the material while allowing flow of a hydrogen gas and a low pressure hydrogen storage container to hold the support and the hydrogen gas; a fluid bed; and/or a filter bag. The materials of this invention can be pressed, sintered, or pressed and sintered into a form with an average minimum dimension of greater than about 1 millimeter, wherein the surface area of the form is at least 50% of the surface area of the nanoparticles.

This invention includes hydrogen storage systems for use with a portable fuel cell, vehicles, transportation, distribution, stationary fuel cells, point-of-generation storage, and to average out periodically available power sources. The materials of this invention can store hydrogen in the presence of an additional gas or vapor and optionally separate at least some hydrogen from a gas mixture.

The materials of this invention can be used for the following methods: using a macrosized hydride by at least partially replacing the macrosized hydride with the nanoparticles according to claim 1, wherein the macrosized hydride and the nanoparticles differ only in size and morphology; to minimize time lags in delivering hydrogen from onboard reformers;

Some of the materials of this invention can be used as a poison getter, comprising a material capable of separating a poison from an impure hydrogen gas or an impure fuel convertible into hydrogen by a reformer, wherein the poison reduces hydrogen storage capability of a hydrogen storage system or reduces efficiency of the reformer; wherein the material comprises a mixture of non-graphitic nanoparticles capable of adsorbing the poison but not absorbing the hydrogen gas or the fuel, wherein the nanoparticles have an average size of about 2 nanometers to about 200 nanometers; and wherein the material can be removed from the hydrogen storage system or regenerated to remove the poison by heating or chemical treatment.

Some of the materials of this invention can be used for storing and reducing evaporation rates of at least one member selected from the group consisting of methane, ethane, propane and natural gas, wherein the material comprises a mixture of nanophase particles, with an average diameter of 2 to 200 nanometers.

The following example will serve to further typify the nature of this invention but should not be construed as a limitation in the scope thereof, which scope is defined solely by the appended claim.

EXAMPLE 1

Hydrogen Storage Using Palladium Nanophase Particles

One kilogram of 30 nm palladium nanoparticles is placed in a low pressure container with an aperture for hydrogen gas input and output. A heating coil is wrapped around the container for hydrogen release. The nanoparticles are wrapped in a spiral wound hydrogen permeable membrane to avoid particle blow out.

EXAMPLE 2

Hydrogen Storage Using Inexpensive Nanophase Particles

One kilogram of iron nanoparticles with average diameters of 50 nm are held within a hydrogen permeable bag. The bag is expandable to contain the nanoparticles even if the volume within the bag quickly changes. The bag may have pores smaller than 40 nm. The bag is held within a low pressure vessel that is resistant to hydrogen embrittlement and capable of being gently heated and optionally cooled for hydrogen release/uptake.

EXAMPLE 3

Hydrogen Storage for Portable Devices

A metal cylinder, with a 4 cm inner diameter, a pressure release valve, and an openable gas-tight outlet is filled with a mixture of nanoparticles. Over 99% of the nanoparticles are FeTi. Under 1% of the nanoparticles are palladium. The nanoparticles are not perfectly spherical, but have an average equivalent spherical diameter of 50 nm. At least 96% of the nanoparticles have equivalent spherical diameters between 10 nm and 100 nm. Many of the nanoparticles may sometimes be held together by van der Waals forces or other forces of surface attraction. The nanoparticle mixture is placed in sintered metal tubes. The tubes are placed in the cylinder. The metal tubes are permeable to hydrogen, but hold the nanopowder. The nanoparticles are partially held in place by caking and otherwise clogging the pores in the sintered tubes. The metal cylinder is connected to a fuel cell through a miniaturized pressure regulator.

EXAMPLE 4

Method of Making Inexpensive Nanoparticles

Molten magnesium is sprayed though a supersonic nozzle, through a cooled 150 mTorr hydrogen atmosphere, and onto a −77° C. flexible belt. The belt continuously passes through liquid nitrogen, passes through the spray, and then removes deposits by sharp bends and/or knife scrapping. Magnesium and/or magnesium hydride nanoparticles are separated from the belt. A cost effective average equivalent spherical diameter of the nanoparticles is 100 nm. Reducing the pressure of the hydrogen reduces the nanoparticle size and the magnesium to magnesium hydride ratio. The nanoparticles are kept in a hydrogen or inert atmosphere to avoid poisoning or deactivation.

EXAMPLE 5

Method of Making Inexpensive Hydride Storage System

Molten magnesium is sprayed though a supersonic nozzle, through a cooled 150 mTorr hydrogen atmosphere, and onto a polymer film. The polymer film is cooled, but above its glass transition temperature. The polymer film is very permeable to hydrogen and/or is porous. The polymer film is moved past the spray quickly enough to keep the spray coating thin enough to maintain flexibility. The spray coated film is wound in a spiral configuration and placed in a metal or reinforced polymer composite outer container. The container can be disposable, rechargeable, or recyclable.

We claim:
1. A material for storing hydrogen as a hydride, wherein the material comprises:
a physical mixture of
a plurality of non-graphitic first nanoparticles capable of storing hydrogen as a hydride, having an average diameter of about 2 nm to about 200 nm; and
a plurality of second nanoparticles, wherein the second nanoparticles are essentially all different from the first nanoparticles by at least one member selected from the group consisting of chemistry structure, average shape, average size, crystallinity, coating, aggregation, and combinations thereof, the second nanoparticle has an average critical dimension of about 200 to about 950 nanometers, and the second particle is capable of storing hydrogen as a hydride.

2. A material for storing hydrogen as a hydride, wherein the material comprises:
a physical mixture of
a plurality of non-graphitic first nanoparticles capable of storing hydrogen as a hydride, having an average diameter of about 2 nm to about 200 nm; and
a plurality of second nanoparticles,
wherein the second nanoparticles are essentially all different from the first nanoparticles by at least one member selected from the group consisting of chemistry, structure, average shape, average size, crystallinity, coating, aggregation, and combinations thereof,
essentially all of the second particles are structurally different than the first nanoparticles,
the first nanoparticles comprise crystalline material, and
the second nanoparticles comprise amorphous material.

3. A material for storing hydrogen as a hydride, wherein the material comprises:
a physical mixture of
a plurality of non-graphitic first nanoparticles capable of storing hydrogen as a hydride, having an average diameter of about 2 nm to about 200 nm; and
a plurality of second nanoparticles,
wherein the second nanoparticles are essentially all different from the first nanoparticles by at least one member selected from the group consisting of chemistry, structure, average shape, average size, crystallinity, coating, aggregation, and combinations thereof, and
the second nanoparticles are getters of chemicals that could poison the first nanoparticles.

4. A material for storing hydrogen as a hydride, wherein the material comprises:
a physical mixture of
a plurality of non-graphitic first nanoparticles capable of storing hydrogen as a hydride, having an average diameter of about 2 nm to about 200 nm; and
a plurality of second nanoparticles,
wherein the second nanoparticles are essentially all different from the first nanoparticles by at least one member selected from the group consisting of chemistry, structure, average shape, average size, crystallinity, coating, aggregation, and combinations thereof, and the second nanoparticles bind the first nanoparticles together while preserving at least 50% of the surface area of the first nanoparticles to flow of hydrogen gas.

5. A material for storing hydrogen as a hydride, wherein the material comprises:
a physical mixture of
a plurality of non-graphitic first nanoparticles capable of storing hydrogen as a hydride, having an average diameter of about 2 nm to about 200 nm; and
a plurality of second nanoparticles,
wherein the second nanoparticles are essentially all different from the first nanoparticles by at least one member selected from the group consisting of chemistry, structure, average shape, average size, crystallinity, coating, aggregation, and combinations thereof, and
the second nanoparticles at least partially control hydrogen release from the first nanoparticles.

6. A material for storing hydrogen as a hydride, wherein the material comprises:
a physical mixture of
a plurality of non-graphitic first nanoparticles capable of storing hydrogen as a hydride, having an average diameter of about 2 nm to about 200 nm; and
a plurality of second nanoparticles,
wherein the second nanoparticles are essentially all different from the first nanoparticles by at least one member selected from the group consisting of chemistry, structure, average shape, average size, crystallinity, coating, aggregation, and combinations thereof, and
the first nanoparticles comprise a hydrogen permeable coating surrounding a core,
wherein the coating and the core are different materials.

7. A material according to claim 6, wherein the coating is at least one member selected from the group consisting of palladium, an alkyl thiol, an alkyl silane, and combinations thereof.

8. A material according to claim 6, wherein the coating is a plurality of coatings.

9. A material according to claim 6, wherein at least part of the coating catalyzes splitting of molecular hydrogen to atomic hydrogen.

10. A material according to claim 6, wherein the core comprises at least one member selected from the group consisting of iron titanium alloy, junk ore, a precursor metal mixture recovered from ore, and mixtures thereof.

11. A material according to claim 6, wherein the coating agglomerates a plurality of the cores.

12. A material according to claim 6, wherein the coating is selectively permeable to hydrogen over gases that could poison the core.

13. A material according to claim 6, wherein there is no continuous oxide layer between the coating and the core.

14. A material according to claim 6, wherein essentially all of the first nanoparticles and essentially all of the second nanoparticles are affixed to a support.

15. A material for storing hydrogen as a hydride, wherein the material comprises:
a mixture of
an agglomerate of nanomaterials,
wherein the agglomerate is capable of storing hydrogen as a hydride,
wherein the agglomerate has a diameter of about 2 nm to about 200 nm; and
a particle,
wherein the particle is different from the agglomerate by at least one member selected from the group consisting of chemistry, shape, size, diameter, ability to form a hydride, crystallinity, coating, aggregation, and mixtures thereof.

16. A material according to claim 15, wherein
the agglomerate comprises a plurality of nanomaterials, and
at least one of the nanomaterials is different from the remaining nanomaterials by at least one property selected from the group consisting of chemistry, shape, size, ability to form a hydride, crystallinity, coating, and mixtures thereof.

17. A material according to claim 16, wherein the agglomerate and the particle are affixed to a support.

18. A material for storing hydrogen as a hydride, wherein the material comprises:
a mixture of
a plurality of agglomerates of nanomaterials,
wherein the agglomerates are capable of storing hydrogen as a hydride,
wherein the agglomerates have an average diameter within about 2 nm to about 200 nm;
a plurality of nanoparticles,
wherein the nanoparticles have an average diameter within about 2 nm to about 200 nm; and
a support,
wherein the agglomerates, the nanoparticles, and the support each have different chemistries and structures.

19. A material according to claim 1, further comprising:
a plurality of third nanoparticles,
wherein the first nanoparticles, the second nanoparticles, and the third nanoparticles all have different chemistry, structure, and average size.

* * * * *